United States Patent [19]

Otani et al.

[11] 4,354,349

[45] Oct. 19, 1982

[54] EXHAUST SYSTEM FOR AN INTERNAL COMBUSTION ENGINE

[75] Inventors: Junji Otani, Omiya; Yasuo Ikenoya, Kawagoe, both of Japan

[73] Assignee: Honda Giken Kogyo Kabushiki Kaisha, Tokyo, Japan

[21] Appl. No.: 184,317

[22] Filed: Sep. 5, 1980

[30] Foreign Application Priority Data

Sep. 7, 1979 [JP] Japan .................................. 54-114167

[51] Int. Cl.³ .......................... F01N 3/28; F01N 1/08
[52] U.S. Cl. ...................................... 60/299; 181/232; 181/265
[58] Field of Search .................... 60/299; 181/232, 265

[56] References Cited

U.S. PATENT DOCUMENTS

| | | | |
|---|---|---|---|
| 3,771,967 | 11/1973 | Nowak | 60/299 |
| 3,841,841 | 10/1974 | Torosian | 60/299 |
| 3,972,685 | 8/1976 | Hanaoka | 60/299 |
| 4,154,058 | 5/1979 | Mase | 60/299 |
| 4,188,783 | 2/1980 | Sayo | 60/299 |
| 4,192,402 | 3/1980 | Nakagawa | 181/256 |
| 4,290,501 | 9/1981 | Tanaka | 181/265 |

Primary Examiner—Douglas Hart
Attorney, Agent, or Firm—Armstrong, Nikaido, Marmelstein & Kubovcik

[57] ABSTRACT

An exhaust system for an engine of a motorcycle is disclosed having catalytic and silencing mufflers arranged in adjacent side-by-side series flow relationship, the catalytic muffler extending rearwardly of the motorcycle, and, adjacent its rear end, being interconnected with the silencing muffler, the silencing muffler including plural expansion chambers which are interconnected in flow reversal relationship for gases to be exhausted rearwardly of the motorcycle.

6 Claims, 5 Drawing Figures

EXHAUST SYSTEM FOR AN INTERNAL COMBUSTION ENGINE

FIELD OF THE INVENTION

This invention relates to an exhaust system for an internal combustion engine, and particularly relates to an exhaust system for a multi-cylinder internal combustion engine of a motorcycle. While not limited thereto, the exhaust system of the present invention finds particular application for incorporation into a motorcycle including a four or six cylinder internal combustion engine having the respective cylinders arranged inline and extending transversely of the longitudinal direction of the motorcycle.

BACKGROUND OF THE INVENTION

The need to provide an internal combustion engine of a motorcycle with a silencing system is well known, and, various arrangements of silencing mufflers have been proposed and are well known for this purpose.

More recently, requirements have been imposed for the incorporation of exhaust purifying devices into the exhaust systems of motorcycles, the exhaust purifying devices being constituted by catalytic or other converters which are arranged in series flow relationship with the silencing muffler.

The incorporation of a catalytic converter into the exhaust system of a motorcycle gives rise to acute problems in arranging the catalytic converter and the silencing muffler in an aesthetically pleasing manner. Additionally, in view of the limitation on the axial length of the exhaust system in a longitudinal direction of the motorcycle, acute engineering problems arise in maintaining the catalytic converter and the silencing muffler within the permitted axial length, without sacrificing efficiency of the silencing muffler in its sound attenuating capacity.

BRIEF SUMMARY OF THE INVENTION

The present invention overcomes the problems inherent in known exhaust systems incorporating a catalytic converter, by providing muffler sections which are arranged in adjacent side-by-side relationship, and which are interconnected for series flow of the exhaust gases through the respective sections.

The present invention provides a muffler system in which the catalytic converter is located in an upstream muffler section, the downstream end of the catalytic muffler being connected with the upstream end of one or a plurality of silencing mufflers having interconnected expansion chambers which are arranged serially and which exhaust gases in a direction rearwardly of a motorcycle.

By this arrangement, not only can an aesthetically pleasing muffler system be provided, but additionally, an extremely compact muffler system is provided having an extended flow path which greatly exceeds the flow path of conventional motorcycle mufflers by as much as twice the length of a conventional muffler, thus providing a muffler of extremely high sound attenuating capacity.

The substantial increase in the length of the flow path arises more particularly from the necessity of exhausting the engine gases rearwardly of the motorcycle. In view of the side-by-side relationship of the catalytic muffler and the silencing muffler, this gives rise to the advantage that the silencing muffler can be formed as a flow reversal device in which exhaust gases from the catalytic muffler are first fed forwardly through the silencing muffler through an interconnected series of sound attenuating chambers, and then reversed for the exhaust gases to flow through another series of sound attenuating chambers prior to exhaust of the gases rearwardly of the motorcycle.

DESCRIPTION OF THE INVENTION

Figure 1:
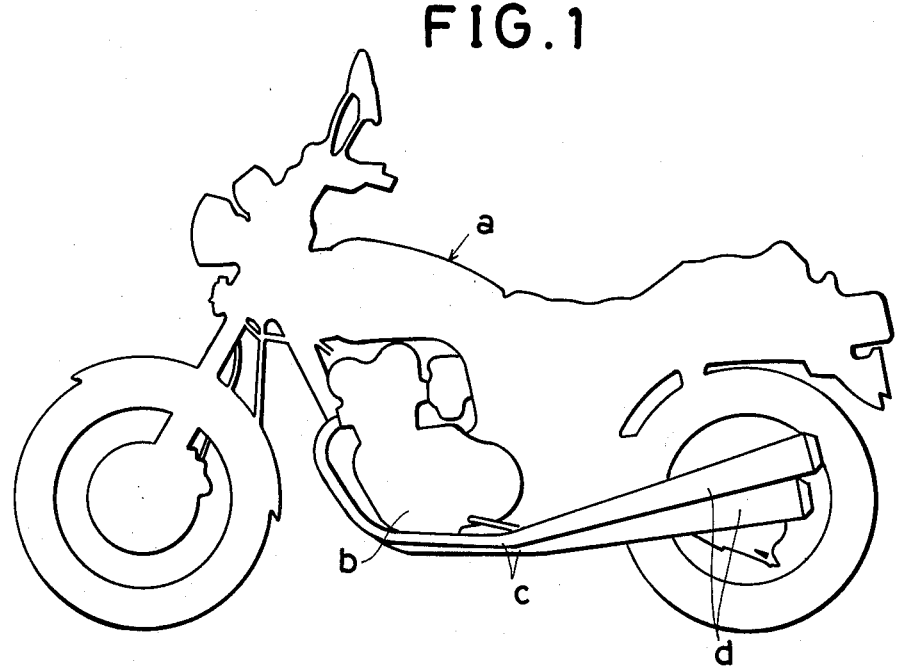
FIG. 1 is a diagrammatic side view of a conventional motorcycle incorporating a known exhaust system.

For the purposes of illustration only, FIG. 1 shows a conventional motorcycle a having an engine b of the "straight four" type, i.e., an engine in which the four cylinders are arranged in-line with the axis of the respective cylinders lying in a common plane extending transversely of the motorcycle. Each cylinder is provided with an exhaust pipe c, two of the exhaust pipes extending longitudinally on one side of the motorcycle, the remaining two exhaust pipes extending longitudinally of the opposite side of the motorcycle. Mufflers d are connected to the rear end of the respective exhaust pipes c, the two mufflers d on the respective opposite sides of the motorcycle serving as an important element of the overall design of the motorcycle, which has a visual impact enhancing the marketability thereof.

Recent requirements for motorcycles are that the exhaust system thereof be provided with an antipollution device, such as a catalytic converter, this giving rise to problems in incorporating that device into the exhaust system in an aesthetically pleasing manner, the requirement giving rise to the further problem of incorporating such an antipollution device into the system without decreasing the efficiency of the muffler system in its capacity of a noise attenuating device.

Figure 2:
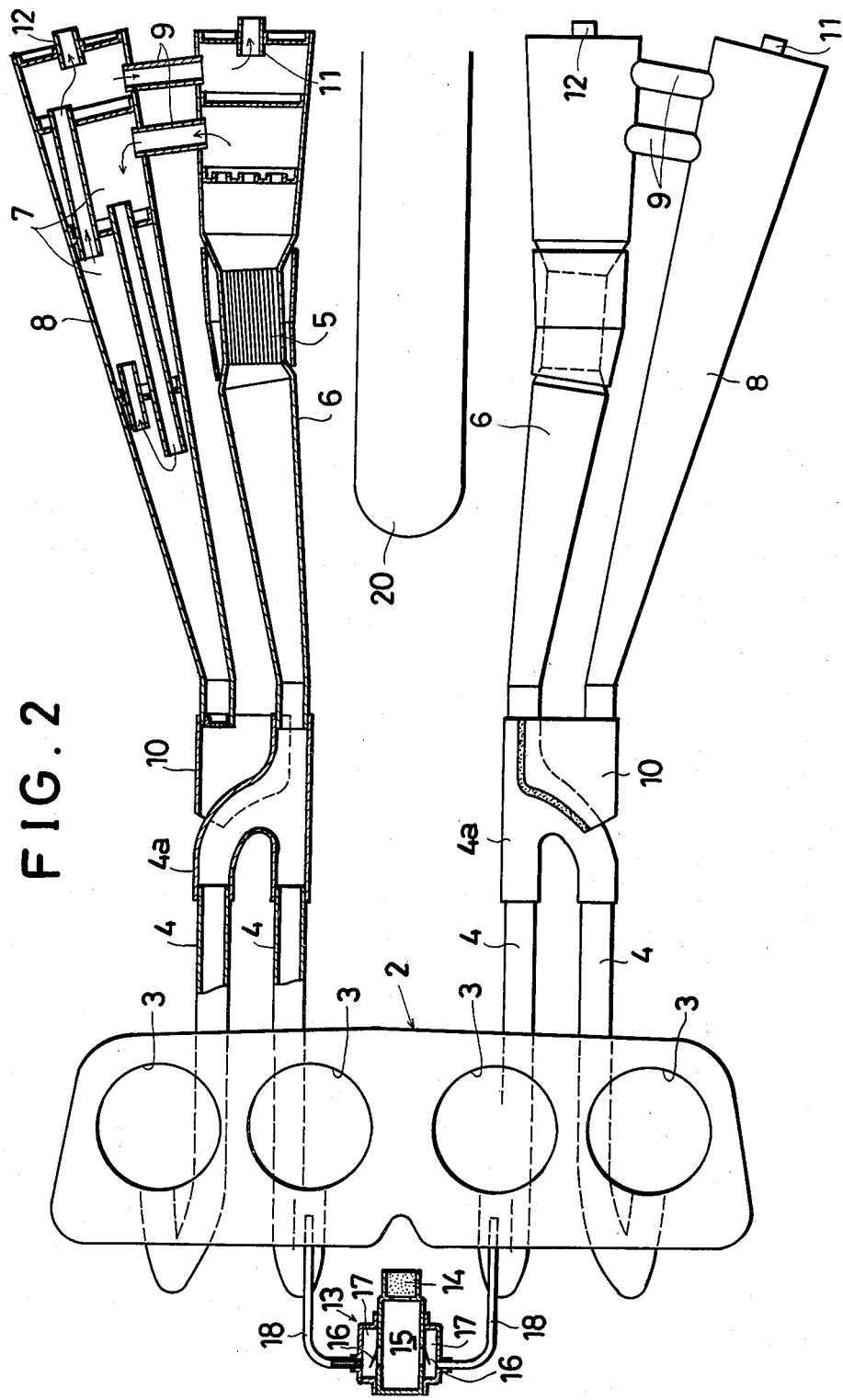
FIG. 2 is a diagrammatic plan view of the exhaust system of the present invention, with one of the mufflers shown in section, the respective mufflers being shown displaced from the generally vertical array shown in FIG. 1 for convenience of illustration.

The engineering problems encountered in incorporating an antipollution device into the exhaust system are overcome, according to the present invention, in the manner illustrated in FIG. 2, which illustrates an exhaust system according to the present invention incorporated into a motorcycle of the "straight four" type.

Figure 3:
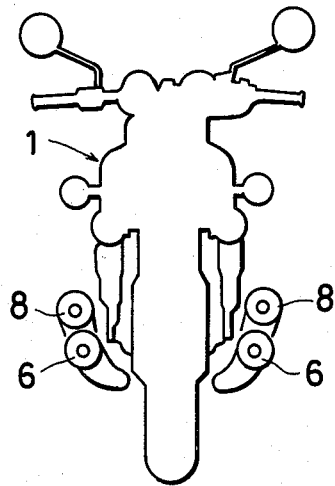
FIG. 3 is a diagrammatic rear view of a motorcycle incorporating the muffler system of FIG. 2.

In FIG. 2, dual exhaust systems are shown for convenience of illustration, with the respective exhaust systems displaced from their generally vertical orientation as illustrated in FIG. 3. It will be understood that, rather than to be horizontally disposed, as illustrated in FIG. 2, the respective muffler systems will be oriented in a generally vertical direction as illustrated in FIG. 3, with a first muffler section 6 of the exhaust system positioned generally beneath a second muffler section 8 of the exhaust system.

Referring now more particularly to FIG. 2, there is diagrammatically illustrated a cylinder block 2 of the engine having four cylinders 3 arranged in in-line formation. An exhaust pipe 4 extends from each cylinder, the respective pairs of exhaust pipes on the opposite side of the longitudinal center line of the motorcycles being connected to a manifold 4A of the respective muffler systems.

Each muffler system is comprised of two main sections, namely, a catalytic converter section 6 incorporating a catalytic converter 5, and, a sound attenuating muffler section 8 incorporating closed expansion chambers 7 and conduits interconnecting selected pairs of the expansion chambers. The rearward ends of respective muffler sections 6 and 8 are interconnected by conduits 9, while the forward end of the muffler section 8 is rigidly supported from the manifold 4a by a bracket 10.

The manifold 4a acts to direct the exhaust gases from a pair of cylinders 3 to the first muffler section 6 incorporating the catalytic converter, the first muffler section incorporating an expansion chamber and a diffuser downstream of the conduit 9 interconnecting the muffler section 6 with the muffler section 8. Exhaust gases entering the second muffler section 8 are expanded in the chamber 7 associated with the conduit 9, and then pass forwardly through the conduit shown, to an expansion chamber at the forward end of the second muffler section 8. At this point, the direction of flow of the exhaust gases is reversed, and the exhaust gases are passes through further expansion chambers 7 to an expansion chamber at the rear end of the second muffler section 8, where a portion of the gases are exhausted to atmosphere through a conduit 12. The remaining gases pass through the other of the interconnecting conduits 9 to an expansion chamber at the rear end of the first muffler section 6, at which point the gases are exhausted to atmosphere through a conduit 11.

It will be noted that by the teachings of the present invention, the visual appearance of two separate mufflers is preserved, while at the same time, the flow path through the respective mufflers is greatly increased in length, thus readily permitting the incorporating of a catalytic converter into the system, while at the same time providing for greater attenuation of noise by virtue of the increase in length of the flow path of the exhaust gases.

In FIG. 2, there is additionally illustrated the required apparatus 13, for introducing secondary air into the respective exhaust systems, the introduction of secondary air being necessary for proper functioning of the catalytic converter 5. The device 13 includes an air chamber 15 communicating with atmosphere through an air filter 14, and which communicates with side chambers 17 through the intermediary of reed valves 16, 16 arranged to operate in response to exhaust pulsation. The respective chambers 17 communicate with pipes 18, 18, which are respectively connected to one of the exhaust pipes 4 of each of the exhaust systems.

A rear wheel of the motorcycle is diagrammatically illustrated at 20, in order to clearly indicate the positioning of the respective exhaust systems.

As will be readily appreciated, the exhaust system of the present invention would find equal application in a two-cylinder in-line engine, or, for that matter, a single cylinder engine, in which event the manifold 4a would be modified as appropriate to accommodate but a single exhaust pipe 4.

Figure 4:
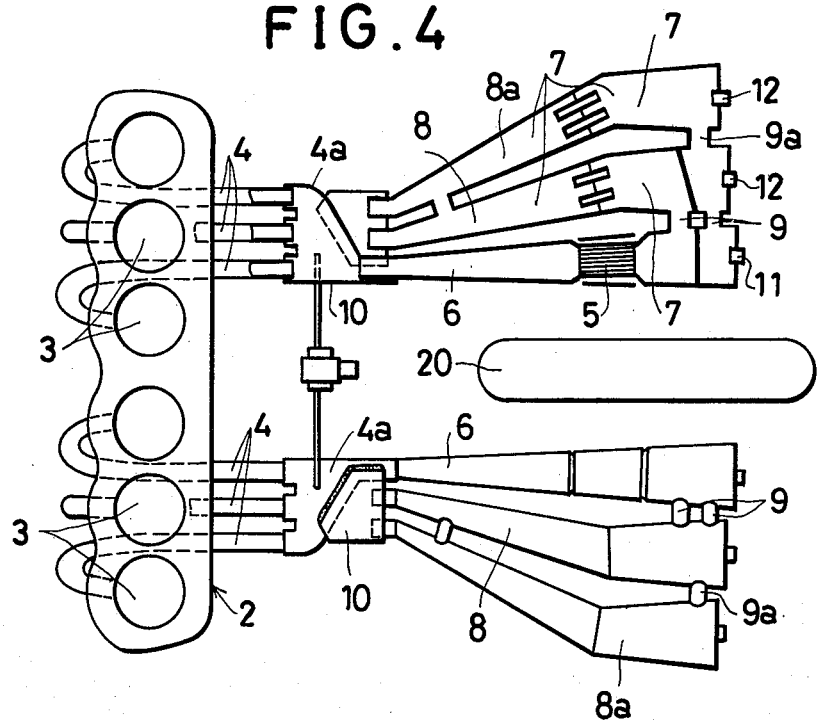
FIG. 4 is a diagrammatic plan view, similar to that of FIG. 2, showing an alternative form of exhaust system of the present invention.
Figure 5:
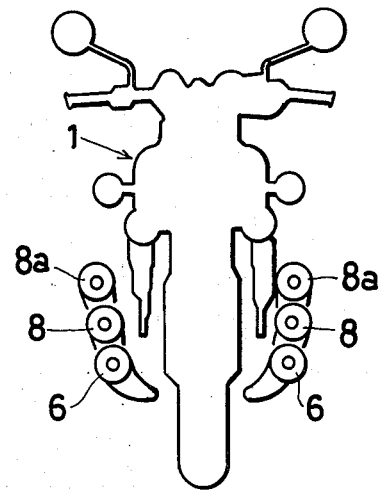
FIG. 5 is a diagrammatic rear view of a motorcycle incorporating the muffler system of FIG. 4.

Referring now to FIGS. 4 and 5, there is shown a muffler system of the present invention as applied to a "straight six" engine, having three cylinders arranged on each side of the longitudinal center line of the motorcycle. In FIG. 4, each group of cylinders 3 is connected by an exhaust pipe 4 with a manifold 4a, the manifold 4a directing the exhaust gases into a first muffler section 6 incorporating a catalytic converter 5. The gases leaving the catalytic converter are passed laterally into a second muffler section 8 incorporating expansion chambers 7, and are then passed into a third muffler section 8a incorporating further expansion chambers 7, the expansion chambers being interconnected by conduits as illustrated. At the rearward end of the third muffler section 8a, a portion of the exhaust gases are exhausted to atmosphere through a conduit 12, the remainder of the exhaust gases being directed through conduits 9a and 9 to expansion chambers at the rearward ends of the first and second muffler sections, at which point the gases are exhausted to atmosphere through conduits 12 and 11.

While the invention has been disclosed herein by reference to details of certain preferred embodiments thereof, it is to be understood that such disclosure is intended in an illustrative, rather than in a limiting sense, and it is contemplated that various modifications in the construction and arrangement of the respective parts readily will occur to those skilled in the art, within the spirit of the invention and the scope of the appended claims.

What is claimed is:

1. In combination with a two-wheeled motor vehicle having an internal combustion engine, an exhaust system comprising:
   an elongate first muffler section having a exterior surface entirely exposed to atmosphere and incorporating a catalytic converter and which has a front, upstream end connectable to an exhaust manifold of said engine,
   an elongate second muffler section having an exterior surface entirely exposed to atmosphere and incorporating sound attenuating elements, said second section extending in adjacent side-by-side relationship with said first muffler section,
   a conduit interconnecting said first muffler section at its rearward, downstream end with the adjacent rearward end of said second muffler section, and
   at least one outlet conduit associated with said second muffler section and which communicates the interior of said second muffler section with atmosphere at a position spaced rearwardly of said conduit interconnecting said first and second muffler sections, said second muffler section including:
   a plurality of transverse walls spaced axially thereof and defining closed expansion chambers,
   conduits interconnecting selected ones of said closed expansion chambers in series flow relationship, and
   said outlet conduit communicating a final expansion chamber of said series with atmosphere.

2. The exhaust system according to claim 1, in which said first muffler section includes:
   a closed expansion chamber at the downstream end thereof;
   a conduit communicating said expansion chamber of said first muffler section with atmosphere, and,
   a conduit communicating said expansion chamber of the first muffler section with said final expansion chamber of said second muffler section.

3. The exhaust system according to claim 1, in which said first muffler section includes:
   a support intermediate the ends of the first muffler section for said catalytic converter, plural expansion chambers located downstream of said catalytic converter, and, at least one conduit intercommunicating said expansion chambers.

4. The exhaust system according to claim 1, in which said at least one outlet conduit associated with said second muffler section and which communicates the interior of said second muffler section with atmosphere at a position spaced rearwardly of the said conduit interconnecting said first and second muffler sections comprises:

an elongate third muffler section incorporating sound attenuating elements, said third section extending in adjacent side-by-side relationship with said first and second muffler sections, and an interconnection between said second muffler section and said third muffler section, which connects said third muffler section in series flow relationship with said second muffler section.

5. The exhaust system according to claim 4, in which said second and third muffler sections include:

a plurality of transverse walls spaced axially thereof and defining closed expansion chambers, conduits interconnecting selected ones of said expansion chambers in series flow relationship, and, conduits communicating at least one of the expansion chambers at the downstream end of said series with atmosphere.

6. The exhaust system according to claim 5, including further conduits intercommunicating expansion chambers at the downstream end of said first and second muffler sections, and an expansion chamber at the upstream end of said second muffler section, and, conduits communicating the said respective downstream and upstream expansion chambers with atmosphere.

* * * * *